United States Patent [19]

Kimura

[11] Patent Number: 5,949,058
[45] Date of Patent: Sep. 7, 1999

[54] RECORDING MEDIUM HOLDER, RECORDING MEDIUM PROCESSING APPARATUS, AND CARD-TYPE RECORDING MEDIUM FEEDING METHOD

[75] Inventor: Hiroshi Kimura, Chigasaki, Japan

[73] Assignee: IBM Corporation

[21] Appl. No.: 08/813,812

[22] Filed: Mar. 6, 1997

[30] Foreign Application Priority Data

Mar. 6, 1996 [JP] Japan .................................. 8-048545

[51] Int. Cl.⁶ .................................................... G06K 7/00
[52] U.S. Cl. ........................ 235/486; 235/380; 235/449; 235/493; 150/147
[58] Field of Search .................................. 235/475, 479, 235/480, 483, 485, 493, 486, 380, 449; 150/145, 147; 206/37, 39, 449

[56] References Cited

U.S. PATENT DOCUMENTS

| | | | |
|---|---|---|---|
| 3,803,388 | 4/1974 | Williamson et al. | 235/61.11 D |
| 3,951,251 | 4/1976 | Zaccagnino, Jr. | 197/127 R |
| 3,983,388 | 9/1976 | Gugliotta | 250/233 R |
| 4,034,210 | 7/1977 | Hill et al. | 235/61.12 N |
| 4,743,129 | 5/1988 | Keryhuel et al. | 400/582 |
| 4,944,616 | 7/1990 | Watanabe et al. | 235/379 X |
| 4,947,029 | 8/1990 | Kurihara et al. | 235/475 |
| 5,326,964 | 7/1994 | Risser | 235/486 X |
| 5,339,421 | 8/1994 | Housel, III | 395/700 |
| 5,494,544 | 2/1996 | Hill et al. | 235/380 X |
| 5,506,395 | 4/1996 | Eppley | 235/486 |

FOREIGN PATENT DOCUMENTS 1-154217  6/1989  Japan .

*Primary Examiner*—Donald Hajec
*Assistant Examiner*—Jared J. Fureman
*Attorney, Agent, or Firm*—Romualdas Strimaitis; Konrad Raynes & Victor

[57] ABSTRACT

A magnetic card is set to an exclusive cardholder and inserted into a passbook printer. The passbook printer can read a magnetic stripe of a passbook and print the passbook or a document. The cardholder is fed by a feed roller or the like. Control device can detect the length of the cardholder by an insertion slot sensor. The control device adjusts the position of a magnetic stripe to the position of a magnetic head by the feed roller and the magnetic stripe is read by the magnetic head. The control device decides whether the read data is the data in the magnetic card or the data in the passbook in accordance with the format of the read data.

14 Claims, 10 Drawing Sheets

| | Dimension (mm) |
|---|---|
| a | Up to 5.54 |
| b | At least 11.89 |
| c | Up to 2.92 |

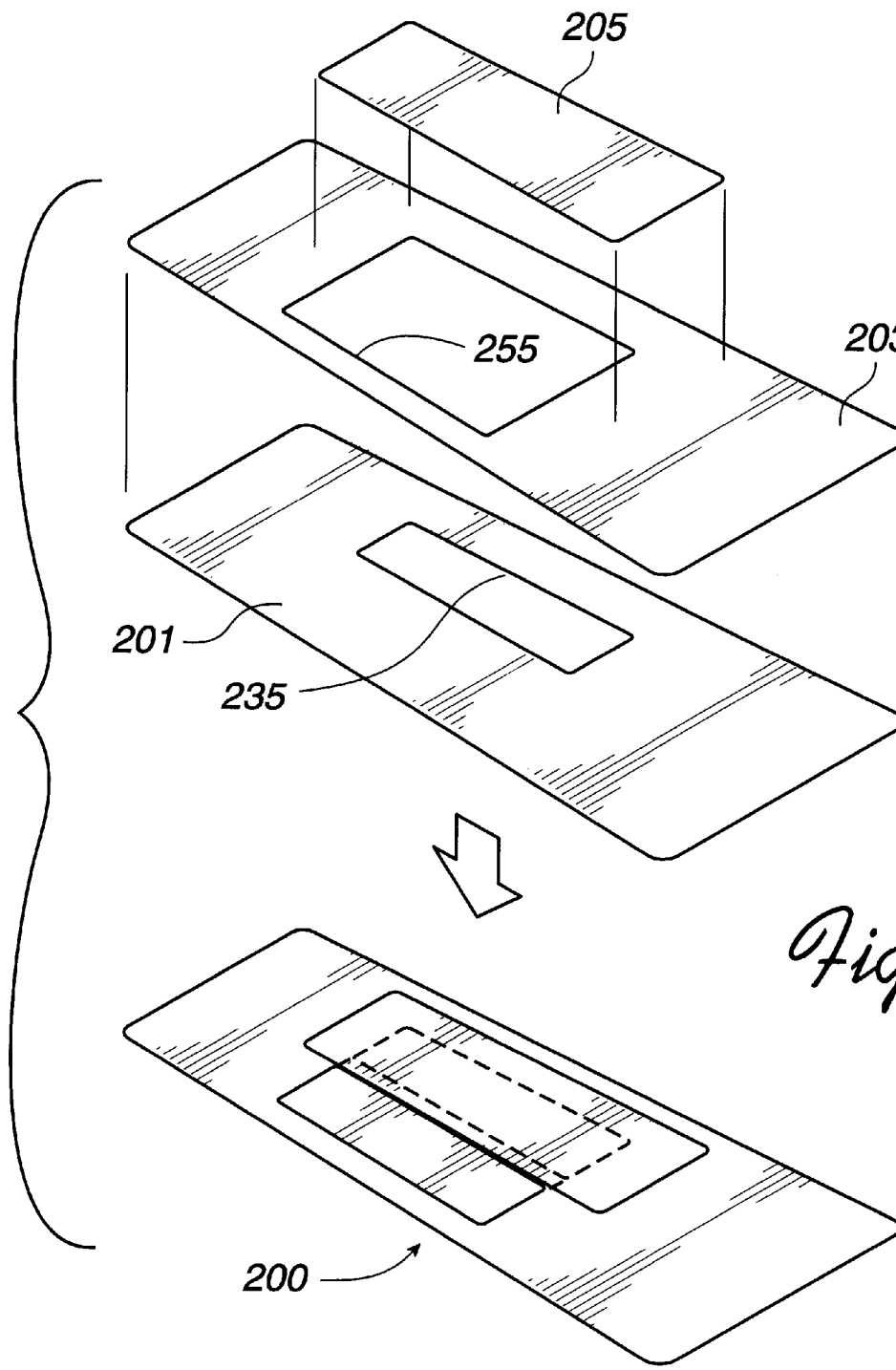

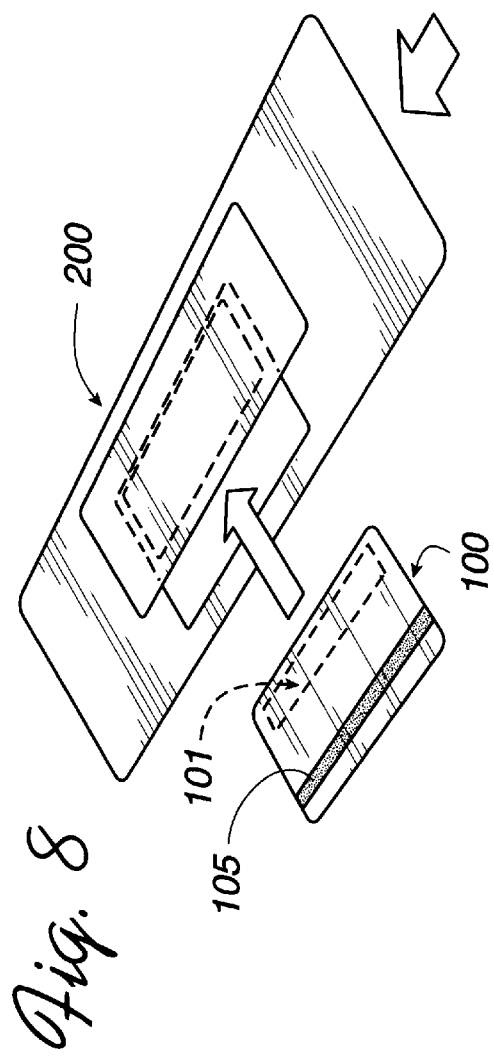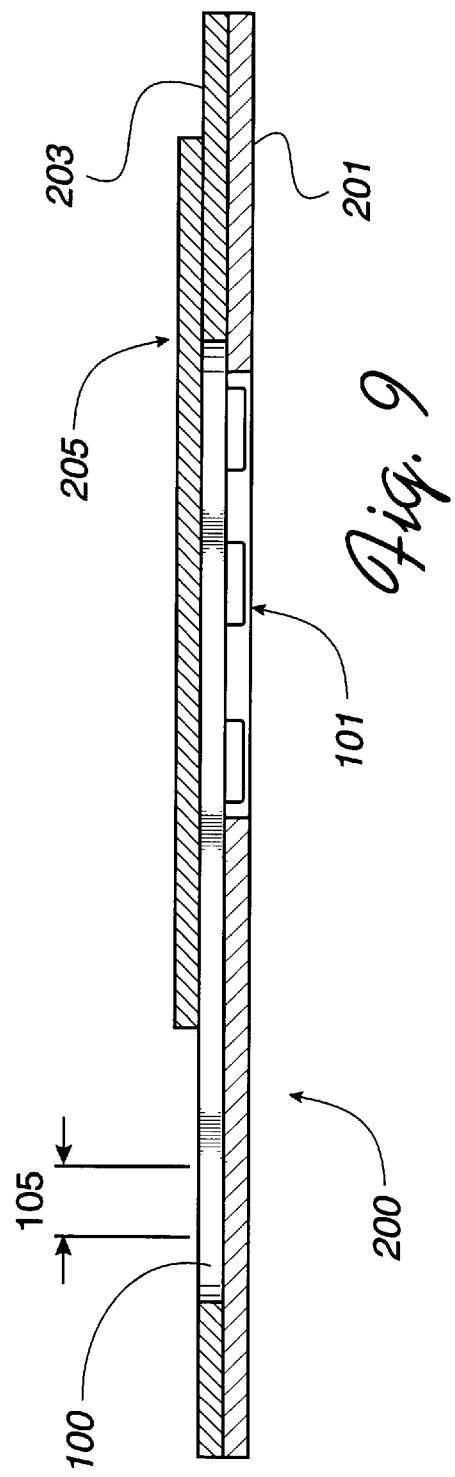

RECORDING MEDIUM HOLDER, RECORDING MEDIUM PROCESSING APPARATUS, AND CARD-TYPE RECORDING MEDIUM FEEDING METHOD

FIELD OF THE INVENTION

The present invention relates to a method and apparatus for feeding a storage medium and a holder used for the method for processings such as reading, writing, and printing of a storage medium, particularly to a method and mechanism for processing a magnetic card by a passbook printer, and more particularly to a method, a system, and its exclusive holder for processing a magnetic card by a passbook printer after setting the magnetic card to the exclusive holder.

BACKGROUND OF THE INVENTION

In a financial system widely used, a magnetic card such as a cash card, credit card, or ID card of a bank clerk and a passbook having a magnetic stripe such as a deposit passbook are simultaneously processed in many cases. These magnetic cards are mainly inserted into an exclusive magnetic card reader and a magnetic stripe is read. A passbook is inserted into an exclusive passbook printer and a read/write operation of a magnetic stripe located on the surface of the passbook is performed, and characters or numerals are printed on the print surface.

Therefore, a processing apparatus capable of reading a magnetic stripe of a magnetic card, reading/writing a magnetic stripe of a passbook, and printing of characters and numerals on the passbook has a mechanism for processing a magnetic card and a mechanism for processing a passbook and each mechanism requires a head for reading a magnetic stripe and a mechanism for feeding a magnetic card or passbook. This causes the problems that the cost increases and the processing apparatus cannot be decreased in size and weight. Moreover, a control program is redundant because an independent mechanism must be controlled.

To solve the above problems, PR50 of OLIVETTI Inc. ("OLIVETTI" and "PR50" are trademarks of OLIVETTI, Inc.) uses a method of reading a magnetic stripe of a magnetic card, reading a magnetic stripe of a passbook, and printing characters and numerals on the passbook by one mechanism.

However, this method also has various problems. The first problem is one that its design makes it necessary to arrange feed rollers 311, 313, and 315 on a roller setting member 310 at a density higher than that of a conventional passbook printer (see FIG. 14) because it is necessary to directly insert and carry a magnetic card with a width of 85.6 mm and a length of 54.0 mm and to make a magnetic stripe of the magnetic card approach a magnetic head and it is necessary to arrange a roller setting member at a density higher than that of the conventional passbook printer. These restrictions on design result in the fact that the cost increases due to an increased number of parts and that the printer cannot be decreased in size and weight.

The second problem is one that the probability of skew of a magnetic card is increased, due to an irregular shape of embossment which is formed on most magnetic cards, when the magnetic card is directly inserted and fed. The embossment of the magnetic card is not always formed at a constant position. When a plurality of feed rollers are provided on a roller setting member, the likelihood of a magnetic card skew exists because the resistance value received by each feed roller is not uniform. To prevent the skew of the magnetic card, special consideration of design and addition of a special structure are necessary. This also results in the fact that costs are increased and a printer cannot be decreased in size and weight. Moreover, because the embossment on the magnetic card may interrupt the close contact between a magnetic head and a magnetic stripe, it may restrict the design.

The third problem is one that a design must be made so as to increase the pressure applied to each feed roller. A magnetic card is designed in accordance with the standard of ISO or the like (e.g., ISO 7811) and accordingly has a width of 85.6 mm and a length of 54.0 mm. Therefore, a decrease in the number of feed rollers for holding the magnetic card when reading a magnetic stripe by a magnetic head cannot be avoided. To withstand the force produced when the magnetic head rubs a magnetic stripe by a decreased number of feed rollers at the time of a read operation, design must be made so as to increase the pressure to be applied to each feed roller. However, when such a design is made so as to increase the pressure to be applied to each feed roller, a piece of copying pressure-sensitive paper such as carbon reacts when printing a document and thereby, a roller trace may be transferred. Moreover, the probability increases that a phenomenon (generally called a "bird's footprint" by those skilled in the art) in which the ink attached to a feed roller attaches to a print portion at every rotation of the feed roller when printing a passbook or document and while transferring the print portion. Moreover, to improve the feed accuracy while increasing the pressure to be applied to a feed roller, it is necessary to design the feed roller so that it has a large diameter. Therefore, the third problem results in the fact that the printing capacity and the transfer capacity of a passbook printer are deteriorated, the cost is increased, and the printer cannot be decreased in size and weight.

The fourth problem is one that a passbook printer may malfunction or the frequency of malfunction may increase. At present, most passbook printers use a reflection-type optical sensor for detecting the insertion and length of a document or passbook. In the case of a transmission-type optical sensor, a light source and the optical sensor must be arranged so as to hold a document in the normal direction of an document to be inserted. Because a passbook is normally inserted horizontally to the ground, the light source and the optical sensor are vertically arranged. Therefore, dust is collected on the light source or optical sensor arranged at the lower side and its function cannot be executed. In the case of a reflection-type optical sensor, however, a light source and the optical sensor can be arranged above a document and therefore, dust is hardly collected on it. Therefore, a reflection-type optical sensor is used for detecting the insertion and length of a document or the like. In the case of this reflection-type optical sensor, a detection range is set because malfunction or erroneous operation occurs when the sensitivity is set to an excessive high value. Because the range is set on the basis of the color of a document or passbook (color close to white) to be normally inserted, a problem occurs that it is difficult to detect all magnetic cards or optical cards which are formed with various colors (for example, when a card is matt black, it is difficult to detect the reflected light). Therefore, to adopt a direct magnetic card insertion method, it is necessary to select whether to increase the probability of malfunction or erroneous operation of a passbook printer, use a transmission-type optical sensor which is easily influenced by dust, or design a system so that a card with a less reflection color cannot be used.

The fifth problem is one that a design must be made so as to increase the movable range of a magnetic head. The data writing width of a magnetic stripe specified in the ISO standard is at least 85 mm from an end of a passbook. However, when the minimum width of a passbook is specified as 120 mm, it is unnecessary to make a magnetic head movable in a range of 35 mm at the left of the passbook. Therefore, in the case of the left alignment method (method for printing a medium such as a passbook or document by left aligning (left justifying), which is used by PR50 of OLIVETTI, 9055 of IBM and 4772 of IBM) used for many passbook printers at present, it is unnecessary to make a magnetic head movable in a range of 35 mm from a left guide of a feed path of a passbook printer. However, to read a magnetic stripe of a magnetic card by the left alignment method by directly inserting the magnetic card, it is necessary to entirely move a magnetic head to a left guide because the width c is up to 2.92 mm and the position where data is actually written is 7.44 mm (ISO standard 7811/4) separate from the right end (strip is read by turning it downward), as shown in FIG. 2. Moreover, to read a passbook and a magnetic card by the same method, the magnetic head contact moves (reads no data) in an unnecessary range of 35 mm at the left side of the passbook and this causes the magnetic head to deteriorate (this range may be in the area of the cloth rather than that of the magnetic stripe). To avoid the above mentioned, it is necessary to distinguish between a passbook and a magnetic card before reading a magnetic stripe by a magnetic head. Therefore, the fifth problem results in the fact that a magnetic head of a passbook printer is deteriorated, costs are increased by an additional mechanism, and the printer cannot be decreased in size and weight.

The sixth problem is one that the probability of a magnetic card not 20 reacting to a skew correction sensor increases. In particular, the center-insertion-type printer under development at the time of the present application (this description does not correspond to the confession that the printer of this type is already known to the public at the time of application) has a large problem because of correcting skew when a fed medium is skewed. As the premise, whether the medium is skewed or not is decided by two optical sensors set to a roller setting member at a certain interval in parallel. When both of the optical sensors are turned on within a predetermined time, it is decided that the medium is not skewed. However, when either sensor is turned but the other sensor is not turned on within a certain time, it is decided that the medium is skewed. In this case, if a magnetic card is directly inserted and fed, the magnetic card may not pass the position of either sensor or positions of both sensors because the magnetic card normally has a width of 85.6 mm. Moreover, when the interval between two sensors is too small, the detection sensitivity is lowered.

These problems of a passbook printer also occur in an ID card printer requiring a mechanism for feeding an ID card to print the surface of the ID card, an ID card encoder for writing data in a magnetic stripe of an ID card, and an ID card fabrication system for printing the surface of an ID card and writing data in a magnetic stripe.

The present invention solves the above problems by setting a record holding medium to a holder and thereafter processing the medium. A preferred embodiment of the present invention is applied to a passbook printer capable of reading magnetic stripes of a magnetic card and a passbook having a magnetic stripe (hereafter referred to as a magnetic card-compatible passbook printer). The magnetic card is set to an exclusive cardholder and thereafter inserted into and processed by the magnetic card-compatible passbook printer.

A preferred embodiment of the present invention makes it possible to design a magnetic card-compatible passbook printer having less restrictions on design and decreased in size and weight by the exclusive magnetic cardholder.

A preferred embodiment of the present invention provides a storage medium holder for moderating the influence of the shape of a storage medium to be read.

A preferred embodiment of the present invention provides a magnetic card-compatible passbook printer without deteriorating the printing capacity and feeding capacity of the passbook printer.

A preferred embodiment of the present invention provides a magnetic card-compatible passbook printer not being subject to increased malfunction or the frequency of malfunction.

A preferred embodiment of the present invention provides a magnetic card-compatible passbook printer not affected by the type of a magnetic card A preferred embodiment of the present invention provides a magnetic card-compatible passbook printer having less restrictions on the design of the movable range of a magnetic head.

A preferred embodiment of the present invention provides a magnetic card-compatible passbook printer without influencing a skew correction sensor.

SUMMARY OF THE INVENTION

To solve the above problems, the present invention provides a substantially rectangular flat cardholder having a first opening for holding a magnetic card having a magnetic stripe and embossment, a second opening for housing the embossment, and a dropping-out preventive sheet for preventing the magnetic card from dropping out from the first opening wherein the cardholder has a leading edge wider than the length of the magnetic card but narrower than that of a feed path of a magnetic recording medium reading unit, a side edge longer than the width of the magnetic card, and a thickness smaller than that of the feed path. The recording medium reading unit has a concept including a magnetic card reading unit, a magnetic card reading and writing unit, an optical card reading unit, an optical card reading and writing unit, and a magnetic card-compatible passbook printer. For the length of a cardholder of the present invention, only "wider than the length of a magnetic card" is described but the upper limit of the length is not described because an apparatus capable of processing a medium theoretically having unlimited length such as a printer for printing continuous paper is also present. In the case of the printer for printing continuous paper, the continuous paper to be printed can be assumed as a medium with unlimited length by forming it like a loop.

This cardholder is inserted into a feed path of a magnetic recording medium reading unit having a magnetic head for reading a magnetic recording medium and feed rollers for feeding the magnetic recording medium and fed by the feed roller.

According to another aspect of the present invention, a cardholder is rectangular, and the diagonal length of the cardholder is longer than the leading edge of a feed path and the leading edge of the cardholder is narrower than that of the feed path. This shape makes it possible to prevent the cardholder from skewing in the feed path.

According to still another aspect of the present invention, a dropping-out preventive sheet is provided so that the top of a magnetic card is exposed when the magnetic card is set at a width of 11.0 to 20.0 mm. Thereby, it is prevented that a magnetic stripe is exposed from the dropping-out preventive sheet and the dropping-out preventive sheet prevents a magnetic head from traveling. Moreover, it is possible to protect the signature entry portion of the magnetic card.

According to still another aspect of the present invention, a cardholder has an optical notch having a light reflectance of 15% or less to adjust a length of a fed medium to be recognized by an optical sensor for detecting the length of the medium. Thereby, it is possible to adjust a length of a cardholder to be recognized by a magnetic recording medium reading unit.

Still another aspect of the present invention provides a cardholder having an opening for holding a card-type recording medium and having a leading edge longer than the width of the card-type recording medium but narrower than that of a feed path of a reading unit, a side edge being wider than the length of the card-type recording medium, and a thickness smaller than that of the feed path. The cardholder is inserted into a feed path of a recording medium processing apparatus and fed by feed rollers of the recording medium processing apparatus. The cardholder is mainly used for a recording medium processing apparatus in which a recording medium is read or written in parallel with a feeding direction. Moreover, the recording medium processing apparatus has a concept including a magnetic card reading unit, a magnetic card writing unit, an optical card reading unit, an optical card writing unit, a magnetic-card compatible passbook printer, a card printer for printing the surface of a magnetic card or optical card, a magnetic card fabrication system, and an optical card fabrication system.

Still another aspect of the present invention provides a cardholder having an opening for holding a card-type recording medium and having a leading edge wider than the length of the card-type recording medium but narrower than that of a feed path of a reading unit, a side edge being longer than the width of the card-type recording medium, and a thickness smaller than that of the feed path. The cardholder is inserted into a feed path of a recording medium processing apparatus and fed by feed rollers of the recording medium processing apparatus.

Still another aspect of the present invention provides a method for reading data from a magnetic stripe of a magnetic card having embossment by using a magnetic head in a passbook printer which is provided with a magnetic head and a plurality of roller setting members each of which has a plurality of feed rollers on their roller shafts, and includes the step of detecting that a flat cardholder holding a magnetic card at its first opening, housing the embossment of the magnetic card with a second opening formed at the bottom of the first opening, having a dropping-out preventive sheet for preventing the magnetic card from dropping out from the first opening, and having a leading edge wider than the length of the magnetic card but narrower than that of a feed path of the passbook printer, a side edge being longer than the width of the magnetic card, and a thickness smaller than the feed path is inserted into the feed path of the passbook printer, the step of starting the rotation of feed rollers of the passbook printer when it is detected that the holder is inserted into the feed path, the step of feeding the cardholder by feed rollers of a reading unit, the step of adjusting a track in which data stored in the magnetic stripe of the magnetic card held by the cardholder is recorded to the position of the magnetic head, and the step of moving the magnetic head to read data from the magnetic stripe.

According to still another aspect of the present invention, the method of the present invention further includes the step of deciding whether read data is the data recorded in a magnetic stripe of a magnetic card or the data recorded in a magnetic stripe of a passbook. Specifically, it can be decided whether the read data is the former data or the latter data by detecting the length or width of an inserted medium and comparing it with a preset value or by detecting the format of the read data.

Still another aspect of the present invention provides a method for feeding a card-type recording medium in a recording medium processing apparatus provided with a plurality of roller setting members, each of which has a plurality of feed rollers on their roller shafts, and including the step of feeding a flat cardholder for holding the card-type recording medium in its opening and having a leading edge wider than the length of the card-type recording medium but narrower than that of a feed path of a reading unit, a side edge being longer than the width of the card-type recording medium, and a thickness smaller than that of the feed path is inserted into the feed path of the recording medium processing apparatus by using feed rollers of the recording medium processing apparatus when it is detected that the flat cardholder is inserted into the feed path and the step of stopping the card-type recording medium held by the cardholder at a recording medium processing position. The recording medium processing apparatus has a concept including a magnetic card reading position, a magnetic card writing position, an optical card reading position, an optical card writing position, and a position for printing the surface of a magnetic card or optical card.

Still another aspect of the present invention provides a method for reading data from a card-type recording medium or writing data in the card-type recording medium in a recording medium processing apparatus provided with a head for performing a read or write operation and a plurality of roller setting members each of which has a plurality of feed rollers on their roller shafts and including the steps of feeding a flat cardholder for holding the card-type recording medium in its opening and having a leading edge wider than the length of the card-type recording medium but narrower than that of a feed path of a recording medium processing apparatus, a side edge being longer than the width of the card-type recording medium, and a thickness smaller than that of the feed path is inserted into the feed path of the recording medium processing apparatus when it is detected that the flat cardholder is present by using feed rollers of the recording medium processing apparatus, adjusting a data storage position of the card-type recording medium held by the cardholder to the position of the head, and reading data from the card-type recording medium or writing data in the card-type recording medium by using the head.

Still another aspect of the present invention provides a method for reading data from a magnetic stripe of a magnetic card by using a magnetic head in a passbook printer provided with the magnetic head and a plurality of roller setting members each of which has a plurality of feed rollers on their roller shafts and including the step of detecting that a cardholder holding the magnetic card in its opening and having a leading edge wider than the length of the magnetic card but narrower than that of a feed path of the passbook printer, a side edge being longer than the width of the magnetic card, and a thickness smaller than the feed path is inserted into the feed path of the passbook printer, the step of starting the rotation of feed rollers of the passbook printer when it is detected that the cardholder is inserted into the feed path of the passbook, the step of feeding the cardholder by using feed rollers of a reading unit, the step of adjusting a track in which the data in the magnetic stripe of the magnetic card held by the cardholder is recorded to the position of the magnetic head, and the step of moving the magnetic head to read data from the magnetic card.

Still another aspect of the present invention provides a passbook printer capable of reading data from a magnetic stripe of a passbook by a magnetic head, which comprises a flat cardholder holding a magnetic card with a magnetic stripe on its surface at the holder opening and having a leading edge wider than the length of the magnetic card but narrower than that of a feed path of the passbook printer, a side edge being longer than the width of the magnetic card, and a thickness smaller than that of the feed path; an optical sensor capable of detecting that a passbook with a magnetic stripe on its front cover is inserted into the feed path of the passbook printer; feed roller control means for adjusting a track in which the data in the magnetic stripe of the magnetic card held by the cardholder is recorded to the position of the magnetic head by controlling a plurality of feed rollers capable of feeding the passbook and the cardholder jointly with a plurality of roller setting members each of which has the feed rollers on their roller shafts and which are arranged at an interval longer than a short side of the magnetic card; a magnetic head for reading data from the magnetic card; a magnetic head moving motor for moving the magnetic head; and means for deciding whether the data read by the magnetic head is the data recorded in the magnetic card or the data recorded in the passbook.

According to still another aspect of the present invention, whether data read by a magnetic head is the data recorded in the magnetic card or the data recorded in the passbook is decided in accordance with the format of the read data.

Still another aspect of the present invention provides a passbook printer capable of printing a passbook with a print head and reading a magnetic stripe provided on the front cover of the passbook with the magnetic head, which comprises a flat cardholder holding a magnetic card with a magnetic stripe on its surface at the holder opening and having a leading edge wider than the length of the magnetic card but narrower than that of a feed path of a passbook printer, a side edge being longer than the width of the magnetic card, and a thickness smaller than that of the feed path; an optical sensor capable of respectively detecting that a passbook with a magnetic stripe on its front cover and three types of media of a document are inserted into the passbook printer; means for detecting a user input for deciding whether a medium inserted into the feed path is the cardholder, passbook, or document; feed roller control means for controlling the feed rollers capable of feeding the passbook and the cardholder jointly with a plurality of roller setting members each of which has a plurality of feed rollers on their roller shafts and which are arranged at an interval longer than the width of the magnetic card and adjusting a track saving the data of the magnetic stripe stored in the magnetic card held by the cardholder to the position of the magnetic head when the user input is a signal showing any one of the cardholder and the passbook; a magnetic head moving motor for moving the magnetic head to read data from the magnetic card; and means for deciding whether the data read by the magnetic head is the data stored in the magnetic stripe of the magnetic card or the data stored in the magnetic stripe of the passbook.

BRIEF DESCRIPTION OF THE DRAWING

FIG. 4 is an illustration showing an embodiment of a cardholder of the present invention.

FIG. 8 is an illustration showing a procedure for setting a magnetic card to a cardholder which is a preferred embodiment of the present invention.

FIG. 9 is a sectional view of a magnetic card set to a cardholder which is a preferred embodiment of the present invention.

DESCRIPTION OF THE PREFERRED EMBODIMENT

Figure 1:
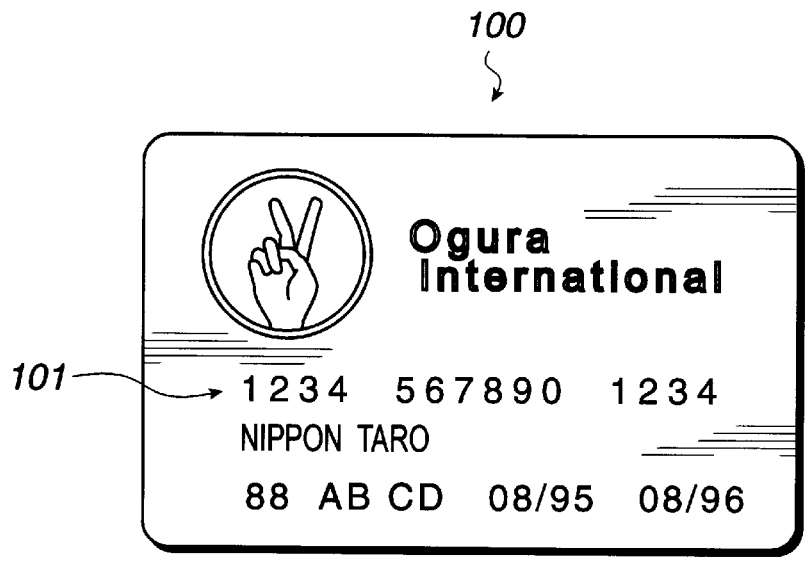
FIG. 1 is an illustration showing the surface of a magnetic card to be processed by a preferred embodiment of the present invention.
Figure 2:
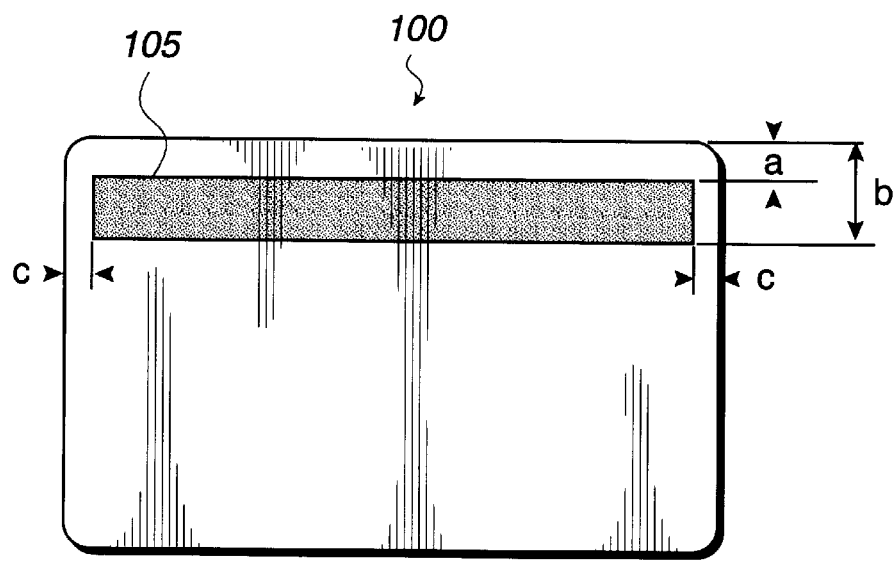
FIG. 2 is an illustration showing the back of a magnetic card to be processed by a preferred embodiment of the present invention.

FIGS. 1 and 2 show an embodiment of an information recording medium processed by the present invention. A card-type information recording medium includes a magnetic card 100 having a magnetic stripe 105 capable of magnetically recording/reproducing information, an optical card having an optical recording/reproducing section capable of optically recording/reproducing information and an optical and magnetic card having a magnetic stripe section capable of magnetically recording/reproducing information and an optical recording/reproducing section capable of optically recording/reproducing information. Moreover, the card-type information recording medium includes a flat medium on which a bar code is printed and a flat medium on which a bar code seal is attached. Furthermore, it is possible to apply the present invention not only to a rectangular medium but also to media having various shapes (including changes in the thickness direction). However, the information recording medium as described hereinafter is directed toward a magnetic card so that readers can easily understand the present invention.

The standard for a magnetic card includes the ISO standard used for a credit card and the like and the JISII-type standard used by Japanese city banks and the like. The magnetic card 100 shown in FIGS. 1 and 2 conforms to the ISO standard. The magnetic card 100 conforming to the ISO standard has an embossed area 101 for displaying a card number, owner's name, and effective period at the lower side on its surface as shown in FIG. 1. The magnetic card 100 conforming to the ISO standard is substantially rectangular having a width ranging from 85.47 to 85.72 mm, a length ranging from 53.92 to 54.03 mm, a thickness ranging from 0.76±0.08 mm, and a corner edge with R of 3.18 mm. The height of the characters in the embossed area 101 is up to 0.48 mm.

Further, as shown in FIG. 2, a magnetic stripe 105 is present on the back of the magnetic card 100 (in the case of the JISII-type standard, a magnetic stripe and an embossed area are present on the surface of a card). As further shown in FIG. 2, the magnetic stripe conforming to the ISO standard is positioned from up to 5.54 mm (a) to at least 11.89 mm (b) from the top of the back of the magnetic card 100, and from up to 2.92 mm (c) from each side of the back of the magnetic card 100.

Figure 3:
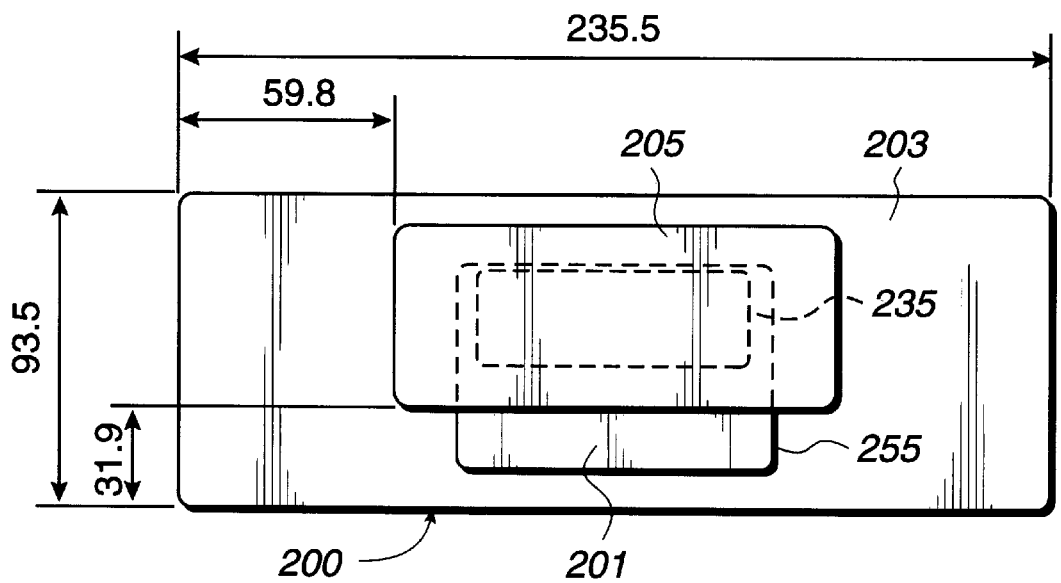
FIG. 3 is an illustration showing an embodiment of a cardholder of the present invention.

FIG. 3 is an illustration showing an illustrative embodiment of the cardholder 200 of the present invention. The cardholder 200 holds a magnetic card conforming to the ISO standard and has a feed path with a width of 236 mm, which may be inserted into a magnetic card-compatible passbook printer whose roller setting members are arranged at an interval of 69 mm. A preferred embodiment of the present invention, as shown in FIG. 4, makes it possible to easily form the cardholder 200 by bonding three cardholder forming members 201, 203, and 205 with each other. In so doing, the cardholder forming members 201 and 203 are bonded to one another by a bonding adhesive tape typically having a thickness of 0.2 mm. It is to be understood that the cardholder 200 can also be formed by molding or etching.

The cardholder 200 has a width of 235.5 mm which is slightly narrower than the width of the above feed path of a passbook printer as described. Therefore, it is possible to prevent the cardholder 200 from deviating or skewing to the right or left while in the feed path. Further, the cardholder 200 has a length of 90.0 mm which is longer than the interval between the roller setting members of the passbook printer as described. Therefore, it is possible to prevent the cardholder 200 from not being fed in the feed path. It is to be understood from the sample of a conventional passbook printer as shown in Table 1 that the size of the cardholder 200 is larger than the minimum processing size of the conventional passbook printer.

TABLE 1

| Type of machine | Mininium passbook size (mm) | | | | Minimum document size (mm) | |
| --- | --- | --- | --- | --- | --- | --- |
| | With no REMS | | With REMS | | | |
| | W | L | W | L | W | L |
| 9055 | 102.0 | 99.0 | 120.0 | 99.0 | 98.0 | 68.6 |
| 4772 | 101.6 | 99.0 | 127.0 | 99.0 | 98.0 | 68.6 |
| 4009 | 102.0 | 99.0 | 127.0 | 99.0 | 99.0 | 68.5 |

Table 1 shows the minimum processing size of documents and passbooks of IBM 9055 passbook printer, IBM 4772 passbook printer, and IBM 4009 passbook printer. In this table, the minimum size of documents and passbooks which can be processed by the passbook printers is large in any direction compared to a width of 85.6 mm and a length of 54.0 mm of the magnetic card 100. Particularly, the minimum processing size of a passbook capable of processing a magnetic stripe is greater than the size of the magnetic card 100 by 34 to 41 mm in width and by 45 mm in length. Therefore, when a magnetic card is inserted directly into one of these passbook printers, it may remain in its feed path.

As shown in Table 1, the minimum processing size (width) for a passbook printer "with REMS" is larger than that in the case of "with no REMS (READ/ENCODE MAGNETIC STRIPE: magnetic stripe read/write)" because the landing point of a magnetic head 305 is not made very close to a left guide. If it cannot be avoided that the head 305 lands near the left guide, it is necessary to form a notch on the left guide surface to prevent a medium from being smoothly guided.

Referring to FIG. 3, the cardholder 200 includes an opening 255 for accepting the magnetic card 100. The cardholder 200 as shown in FIG. 4 is designed to be used by the center insertion-type printer previously described. Referring still to FIG. 4, because the opening 255 is so applied to a passbook printer (see FIG. 12), wherein the magnetic head 305 is driven transversely in relation to the feed path, the magnetic card 100 is set transversely within the cardholder 200. However, in order to read a magnetic stripe longitudinally to the feed path, the opening 255 may be formed so that the magnetic card 100 is set longitudinally to the cardholder 200.

Referring again to FIG. 4, an opening 235 encompasses the embossed area 101 of the magnetic card 100. A cardholder forming member 205 serves as a dropping-out preventive sheet to prevent the magnetic card 100 from dropping out of the opening 255.

Figure 5:
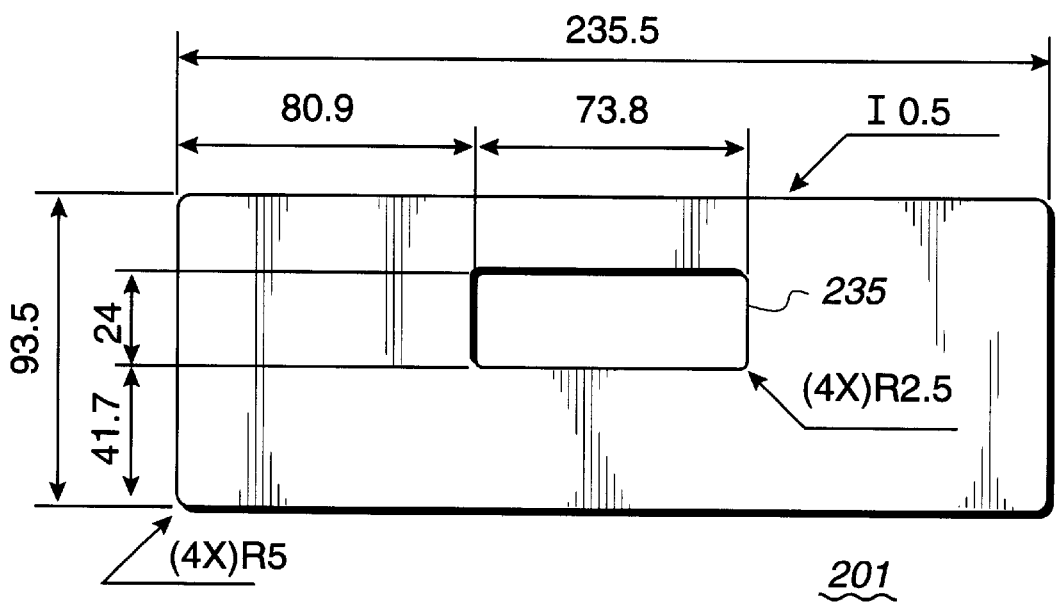
FIG. 5 is an illustration showing an embodiment of a component part of a cardholder of the present invention.
Figure 6:
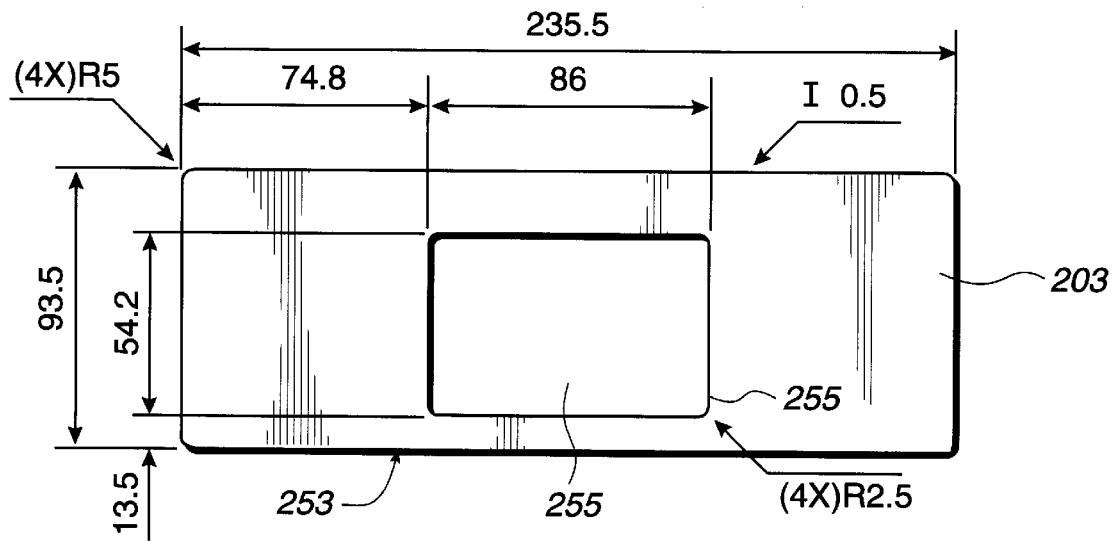
FIG. 6 is an illustration showing an embodiment of a component part of a cardholder of the present invention.

FIGS. 5 and 6 show cardholder forming members 201 and 203, respectively. In the case of a preferred embodiment of the present invention, the cardholder forming members 201 and 203 are constructed from a white polycarbonate material. This is due to the fact that white has a high reflectance and may be easily detected by a reflection-type optical sensor (in the case of a preferred embodiment of the present invention, however, the cardholder forming member 201 need not be white because a reflection-type optical sensor is present only at the cardholder forming member 203 side). Therefore, to carry a magnetic card 100, it is impossible to provide a high reflectance (for example, 60% or more) same as that of other media (document and passbook) for the surface of the magnetic card (because the magnetic card already exists, it is impossible to provide a high reflectance for the magnetic card in view of a pattern and design). However, by using a cardholder of the present invention, a reflection-type optical sensor detects the surface of the cardholder and therefore, accurate detection is realized. Moreover, the reflectance of paper is normally set to 60% or more and its printing portion is made to be 15% or more by considering that the paper may previously slightly be printed.

The cardholder forming members 201 and 203 can be made of not only polycarbonate but also various types of synthetic resins, paper, and wood. However, it is preferable to not use a material which may adversely affect a magnetic head 305 upon coming in contact with a cardholder forming member 201, 203. Therefore, it is preferable to use a material capable of withstanding repetitive feeding and rubbing by a magnetic head 305.

The cardholder forming member 201 covers the embossed area 101 of the magnetic card 100 to protect the area 101 from influences while the magnetic card 100 is fed. Because the thickness of the cardholder forming member 201 is designed so as to be approximately 0.5 mm which is larger than the maximum height of 0.48 mm of embossment, it is possible to decrease influences on the embossment while the magnetic card is fed. However, it is not always necessary to set the thickness of the cardholder forming member 201 to be greater than the height of embossment. Even if the thickness of the cardholder forming member 201 is less than the height of embossment, it is possible to decrease influences on the embossment while the magnetic card is fed because a level difference where a feed roller passes is decreased.

The cardholder forming member 203 has the opening 255 for accepting the magnetic card 100. Because the opening has a size slightly larger than the magnetic card 100, the magnetic card 100 does not move significantly while a magnetic head 305 reads data. The thickness of the cardholder forming member 203 is set approximately at 0.5 mm. Because the thickness of a bonding adhesive tape is approximately 0.2 mm, the member 203 has a total thickness of approximately 0.7 mm, which is almost equal to or slightly smaller than the magnetic card thickness of 0.76±0.08 mm specified in the ISO standard. Otherwise, the cardholder forming member 203 may interrupt the traversing of a magnetic head 305 if the member 203 is thicker than a magnetic card. On the other hand, in the event that the cardholder forming member 203 does not have a sufficient thickness, it cannot withstand the abrasion due to a magnetic head 305 while the magnetic head 305 reads data and the probability for the magnetic card 100 to drop out from a cardholder increases.

In the preferred embodiment of the present invention, the opening 255 is formed at a position 74.8 mm from the left end of a cardholder 200. This is designed by considering the driving position of a magnetic head 305. In establishing the position, it is preferable to design the distance between the opening 255 and the left end of the cardholder 200 by considering the magnetic head driving state when a magnetic stripe of a passbook as shown below is read.

TABLE 2

(1) In the case of IBM 9055 passbook printer (left alignment method)

| Minimum distance from left guide to right end of passbook | Minimum storage area from right end of passbook | Minimum distance from left guide to magnetic data reading position |
| --- | --- | --- |
| 120 mm (Note 1) | 85 mm (Note 2) | 35 mm (120–85) |

Note 1: This size is the same as the minimum passbook width.
Note 2: This is based on the ISO 8484 standard.

TABLE 3

(2) In the case of center insertion-type passbook printer

| Minimum distance from left guide to right end of passbook | Minimum storage area from right end of passbook | Minimum distance from left guide to magnetic data reading position |
| --- | --- | --- |
| 153 mm (Note 3) | 85 mm (Note 4) | 68 mm (153–85) |

Note 3: In the case of this printer, a top sensor 343 to be mentioned later is set at a position 83 mm separate from the left guide and an alignment sensor 345 to be mentioned later is set at a position 153 mm separate from the left guide.
Note 4: This is based on the ISO 8484 standard.

Figure 10:
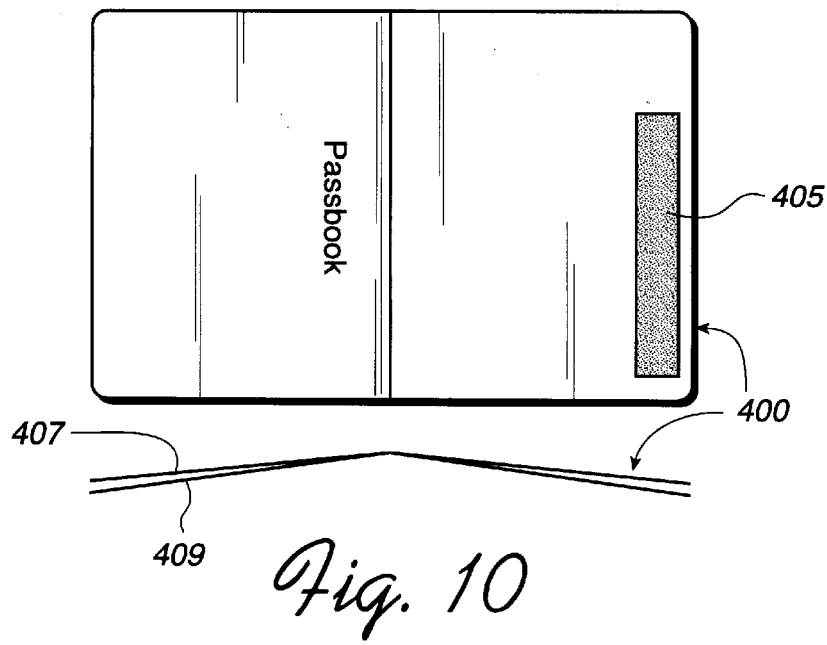
FIG. 10 is an illustration showing a passbook to be processed by a preferred embodiment of the present invention.

The opening 255 of the cardholder 200 shown in FIG. 3 is formed at a position 13.5 mm from the bottom end of the cardholder 200. This distance is designed by considering the data storage position (track position) of a magnetic stripe 405 of a passbook 400 shown in FIG. 10.

Table 4 shows the data storage position used for many magnetic cards and passbooks at present.

TABLE 4

| Track No. | Medium | Distance from bottom end to the center of track |
| --- | --- | --- |
| Track-1 | ID Card (Read-only) | 7.1 |
| Track-2 | ID Card (Read-only) Passbook - IBM Format | 10.4 |
| Track-3 | Passbook - ISO/DIN Format | 13.9 |
| N/A | Passbook - IBM 10 mm shift | 20.4 |
| N/A | Passbook - ISO/DIN 10 mm shift | 23.9 |

Many magnetic cards conforming to the ISO standard have their magnetic stripe in a range for covering track-1 and track-2. In the case of such credit cards as Diners and VISA ("Diners" is a trademark of Diners International, Inc., and "VISA" is a trademark of VISA International, Inc.), different data is written in both tracks respectively. In the case of a passbook, however, one type of data is written in a track of either IBM (track-2) or ISO/DIN (track-3). A conventional passbook printer prepares a track 10 mm deviated from a normal position for convenience sake of users.

It is possible to adjust the reading position of the magnetic stripe 405 of the passbook 400 to the position of the magnetic head 305 because a track to be used of the magnetic stripe 405 of the passbook 400 is previously set to the passbook printer 300 (or a user changes setting). To automatically stop the magnetic card 100 held by the cardholder 200 at a normal position, there are the following methods:

(a) Method for distinguishing between passbook and magnetic card before it is inserted.

A user inputs whether a medium to be inserted is a passbook or magnetic card before inserting the medium. In this case, the size of a cardholder is previously set, a passbook printer recognizes the size, and the cardholder can be stopped in accordance with a passbook reading position. For example, when a magnetic card reading position of track-2 and track-3 is used for the passbook and the opening 255 bottom end of the cardholder, there is a difference of 10 mm because the passbook reading position is 13.9 mm from the bottom end and the magnetic card reading position is 23.9 (13.5±10.4) mm from the bottom end. Therefore, when the cardholder 200 is inserted, a sensor detects the bottom end of the cardholder 200, and thereafter the cardholder 200 is stopped at a position 10 mm before.

(b) Method for distinguishing between passbook and magnetic card until magnetic stripe is read after passbook or magnetic card is inserted.

It is possible to distinguish between a passbook and a magnetic card by setting the length of a cardholder to a value smaller than the minimum passbook length, or by setting the length of a cardholder to a value larger than the maximum passbook length, measuring the length of a medium by a sensor after the medium is inserted, and comparing the length with a preset threshold value. When the passbook is distinguished from the magnetic card, it is possible to stop the cardholder at a position previously designated by application. When the physical length of a cardholder is not made smaller than the minimum passbook length, it is also possible to intentionally decrease a decision length of the sensor by attaching a label with a low reflectance such as a black label to the front end or bottom end of the cardholder 200 or applying a pigment to the front end or bottom end of it. Moreover, it is possible to make a user input whether to make decision with the minimum or maximum passbook length through an input panel.

A passbook printer having a sensor capable of detecting the transverse position or width of a medium distinguishes between a passbook and a magnetic card by setting the width of a cardholder to a value smaller than the minimum passbook width or larger than the maximum passbook width. When the width of the cardholder is set to a value smaller than the minimum passbook width, it is better to attach a label with a low reflectance such as a black label or applying a pigment with a low reflectance to portions reacting to a sensor such as portions 287 and 289 because the decreased width of the cardholder influences feeding. Moreover, it is possible to make a user input whether to make decision with the minimum or maximum passbook width through an input panel.

(c) Method for working on bottom end of cardholder in accordance with track of passbook.

When it is previously input that a medium is not a passbook but a magnetic card or when there is a mechanism for deciding whether a fed medium is a magnetic cardholder or passbook, there is no problem because another stop control can be used. However, it is better to perform stop control without performing previous input or using any special mechanism for making decision. A medium (passbook or magnetic card) is normally stopped at a magnetic stripe reading position by detecting the bottom end of the medium by an optical sensor. However, when the cardholder 200 is used, the bottom end of the opening 255 holding the magnetic card 100 and the cardholder 200 located at the bottom end of the cardholder 200 are trimmed. Therefore, a passbook is recognized by being extended by the trimmed dimension. For example, when the cardholder 200 is inserted into the passbook printer 300 at the same setting as the passbook 400 (when it is assumed that the magnetic card 100 and the passbook 400 use track-2), the stop position overruns by a trimmed dimension (13.5 mm) because the lower part of the cardholder 200 is trimmed. To solve the above problem, there are following methods.

(d) Method for trimming cardholder at passbook reading position-magnetic card reading position.

For example, when a passbook uses track-3 and a magnetic card uses track-2, it is possible to stop the cardholder 200 at a magnetic card reading position without setting that a medium is a magnetic card by setting a trimming dimension to 3.5 mm (13.9- 10.4). This is effective when a reading position from the bottom end of a passbook is farther than a reading position from the bottom end of a magnetic card.

(e) Method for forming an optical notch on cardholder.

As described above, a medium is normally stopped at a magnetic stripe reading position by detecting the bottom end of the medium by an optical sensor. Therefore, by forming a portion which is not recognized by an optical sensor on the cardholder 200, it is possible to adjust an apparent medium length. That is, by cutting the bottom end at a position corresponding to a detection position by a sensor (this is also effective for a transmission-type optical sensor) or applying a black label (Matte treatment is preferable), the portion is not detected by a reflection-type optical sensor. In the case of the cardholder 200 shown in FIG. 3 whose width is adjusted to the width of a feed path or a left alignment-type passbook printer, the bottom end treatment shown in FIG. 11 can be applied because a detection position is already known. In the case of the center insertion method, however, it is preferable to apply a black label or the like to the whole width of the bottom end because a detection position by a sensor is not determined.

Figure 11:
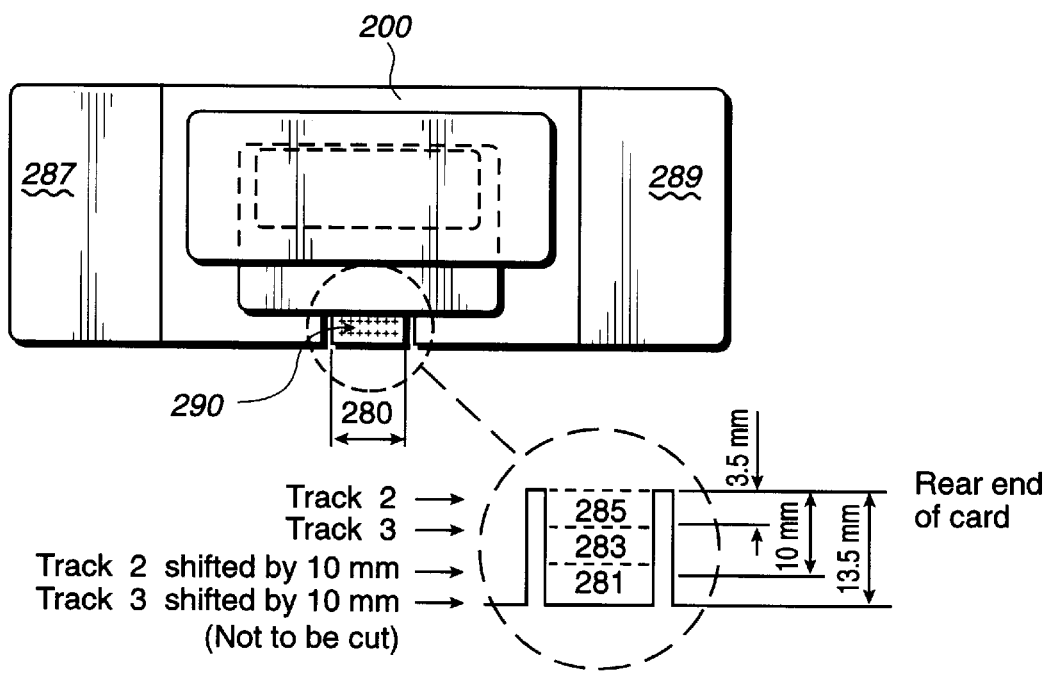
FIG. 11 is an illustration showing an embodiment of a cardholder of the present invention.

FIG. 11 shows an embodiment of the cardholder 200 designed by 20 assuming that the magnetic card 100 uses track-2. When the passbook 400 uses track-3, 10 mm shift (23.9 mm), the rear end of the magnetic card 100 is not cut because the difference with track-2 (10.4 mm) of the magnetic card 100 is 13.5 mm. When the passbook 400 uses track-2, 10 mm shift (20.4 mm), a portion 281 is cut because the difference with track-2 (10.4 mm) of the magnetic card 100 is 10.0 mm. Moreover, when the passbook 400 uses track-3 (13.9 mm), portions 281 and 283 are cut because the difference with track-2 (10.4 mm) of the magnetic card 100 is 3.5 mm. Furthermore, when the passbook 400 uses track-2 (10.4 mm), portions 281, 283, and 285 are cut because the difference with track-2 (10.4 mm) of the magnetic card 100 is 0 mm.

To adjust an apparent medium length by forming a portion not recognized by an optical sensor, the following methods are considered: a method of cutting the medium, a method of applying a label with a low reflectance such as a black label to the medium, a method of applying a pigment to the medium, a method of forming the portions 281, 283, and 285 in black (or with a transmission material) and applying a seal with a high reflectance such as a white seal to the portion 285 (or forming the portions 281, 283, and 285 in black, applying a white seal to the portions 281, 283, and 285, and removing the seal from only the portion 281), and a method of reflecting received light in a direction different from a sensor. Thus, a portion which cannot be detected by an optical sensor is hereafter referred to as an optical notch. An optical notch formed by a black label or the like is effective compared to a method of cutting the bottom end when a reading position from the bottom end of a passbook is nearer than a reading position from the bottom end of a magnetic card. This is because a reflection-type optical sensor detects an object from the back of the cardholder 200 shown in FIG. 11 and thereby, it is possible to form an optical notch also at a portion reaching the opening 255. By using this optical notch, it is possible to stop a medium at a position required each time even if a track used for a passbook is different from a track used for a magnetic card without distinguishing between the passbook and the magnetic card before inserting the passbook or magnetic card into a machine when reading a magnetic stripe.

Therefore, to read a passbook or a magnetic card without distinguishing between the passbook and the magnetic card, it is possible to decide the passbook or magnetic card from the format of read data. This decision method is already known to those skilled in the art because it is disclosed in the official gazette of Published Unexamined Japanese Patent Application No. 1-154217.

Figure 7:
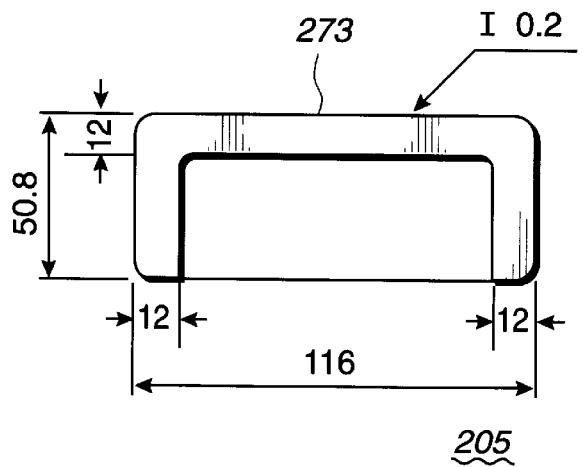
FIG. 7 is an illustration showing an embodiment of a dropping-out preventive sheet used for a cardholder of the present invention.

FIG. 7 is an illustration showing the holder forming member 205 which functions as a dropping-out preventive sheet of the magnetic card 100 by being bonded to the cardholder forming member 203. The dropping-out preventive sheet prevents the magnetic card 100 from dropping out from the cardholder 200. However, because the cardholder 200 is fed along a head plate of a feed path 309, the magnetic card 100 does not always drop out from the opening 255 of the cardholder 200 even if the dropping-out preventive sheet is not used. Moreover, when a lower feed roller 365 (see FIG. 13) greatly protrudes, the magnetic card 100 does not always drop out from the opening 255 of the cardholder 200 while it is fed by setting an elastic body (not illustrated) under the feed path 309 so as to press the magnetic card 100 against the cardholder 200. Furthermore, by setting a magnetic head to the upside of a feed path, the probability of dropping-out of the magnetic card 100 due to the weight of its own is decreased. Therefore, the dropping-out preventive sheet 205 is not an indispensable component of the present invention and it is not always necessary to set the sheet 205 as shown in FIG. 3. For example, it is also possible to form a structure for preventing the magnetic card from easily dropping out by forming a bonding layer at the bottom of the opening 255 or prevent the magnetic card from dropping out by using a slide plate or the like.

The above magnetic card does not interrupt the movement of a magnetic head when the head reads the magnetic stripe of the magnetic card because the magnetic stripe is exposed by setting the magnetic card so that the top of the magnetic card is exposed at a width of 11.0 to 20.0 mm. Moreover, it is possible to prevent the ink attached to a feed roller from being transferred to the signature entry portion of a credit card.

In the case of a preferred embodiment of the present invention, the cardholder forming member 205 is made of a polycarbonate sheet. Moreover, it is possible to use such synthetic resin such as vinyl chloride or polyethylene, cloth, or paper for the member 205. However, it is preferable to use a thin sheet made of a slightly elastic material not influencing feeding of the magnetic card 100 because the card is inserted into the member. When the member 205 is made of an elastic material, the dropping-out preventive sheet serves as a cushion for absorbing the irregularity of embossment even for a magnetic card conforming to the JISII-type standard in which a magnetic stripe and the embossment are present on the same plane.

Figure 16:
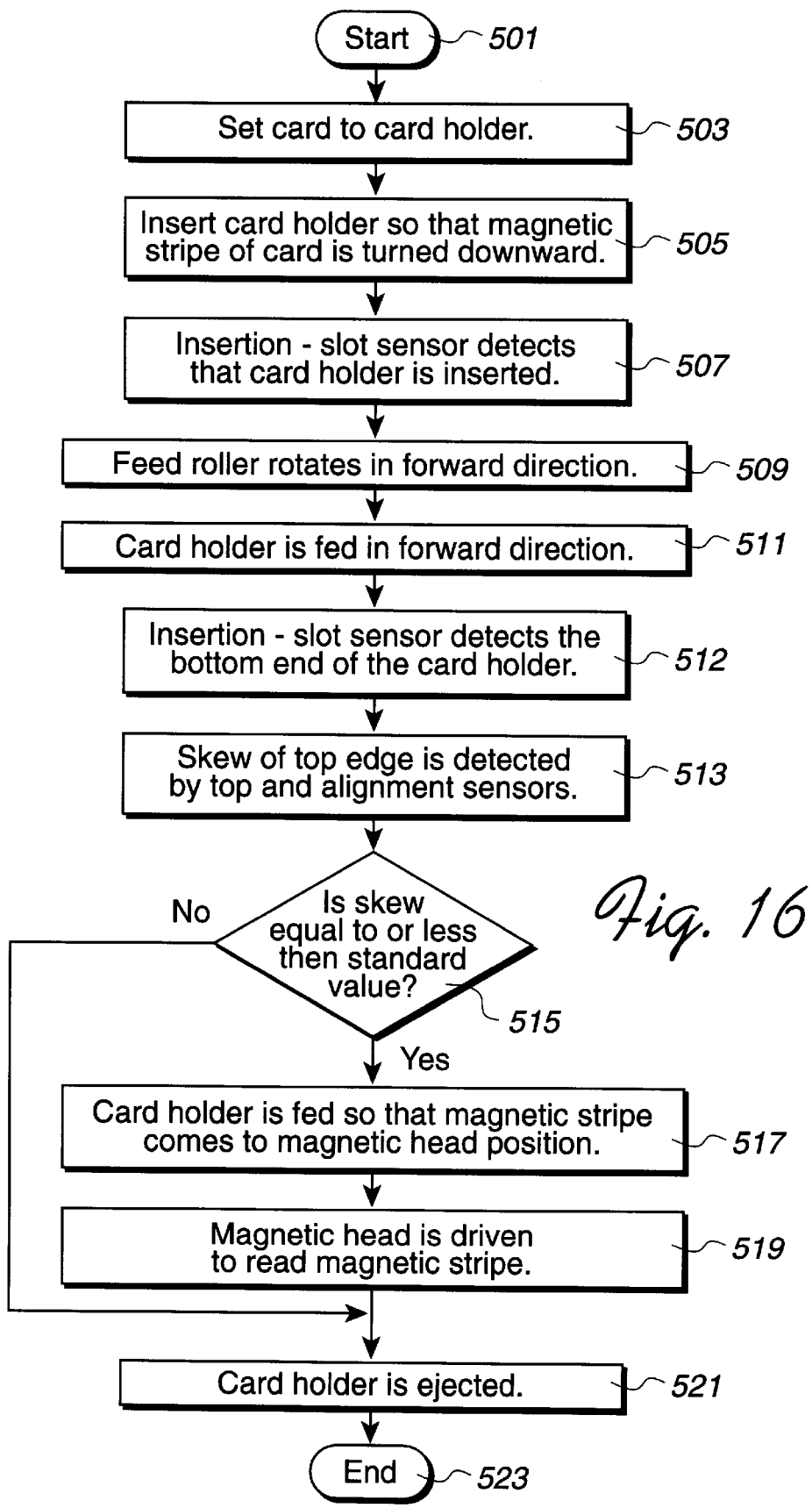
FIG. 16 is an illustration showing an embodiment of a magnetic card reading method of the present invention.

Next, a series of procedures in which the magnetic stripe 105 of the magnetic card 100 is read by the magnetic head 305 are described below by referring to FIG. 16. The magnetic head 305 is able to read a magnetic stripe of a passbook and print the passbook or a document. First, the processing is started with block 501. Then, the magnetic card 100 is set to the cardholder 200 by a user (block 503). To set the magnetic card 100 to the cardholder 200, the back (plane where the magnetic stripe 105 is present) of the magnetic card 100 is turned upward and inserted into the cardholder 200 as shown in FIG. 8 when the magnetic card 100 is a card conforming to the ISO standard. In this case, the embossment 101 is exposed with the opening 235. FIG. 9 is a sectional view viewed from the direction A in FIG. 8 when the magnetic card 100 is set to the cardholder 200.

Figure 12:
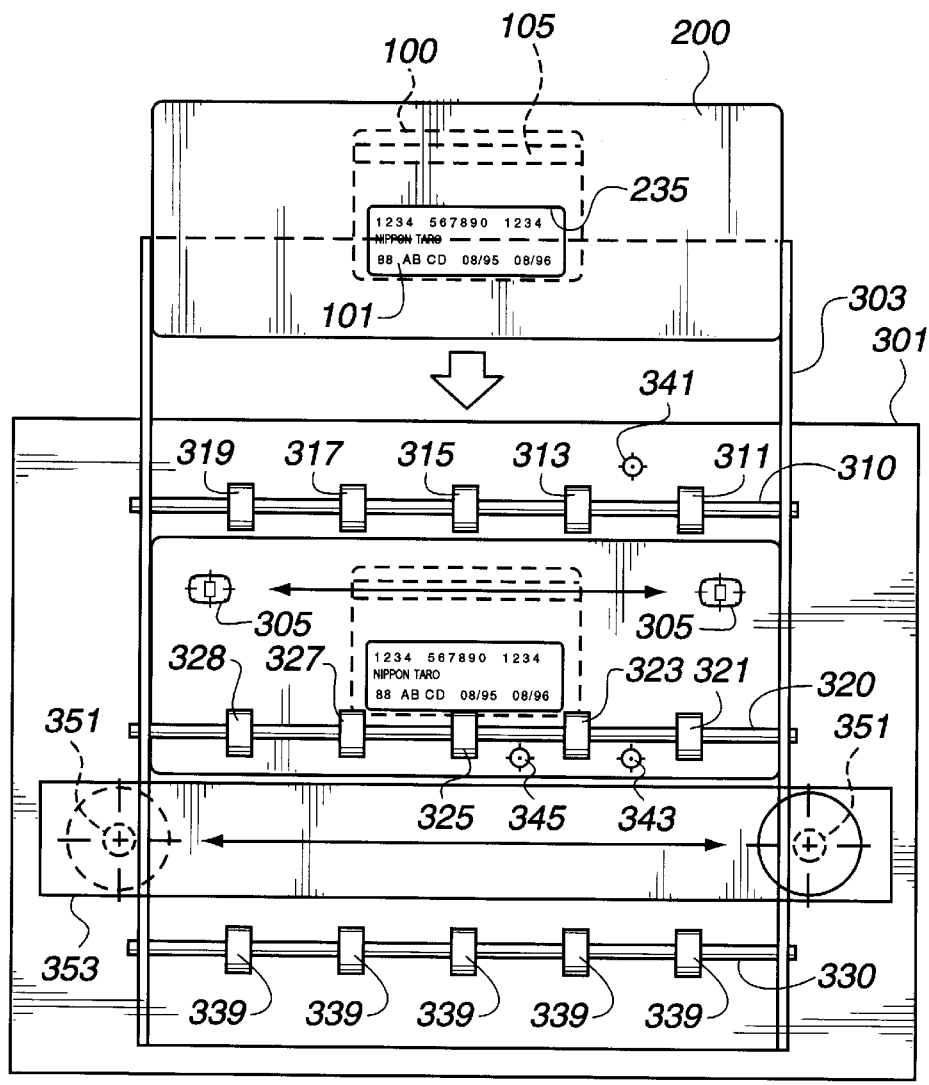
FIG. 12 is an illustration showing an embodiment of a passbook printer of the present invention.
Figure 13:
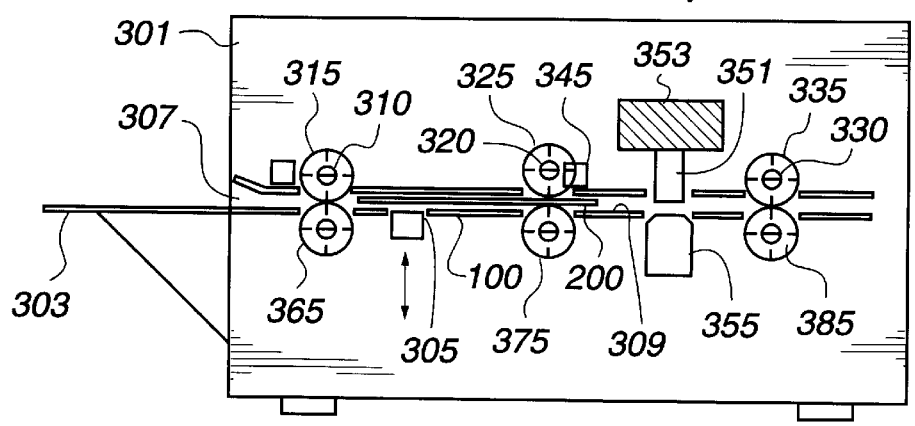
FIG. 13 is an illustration showing an embodiment of a passbook printer of the present invention.
Figure 14:
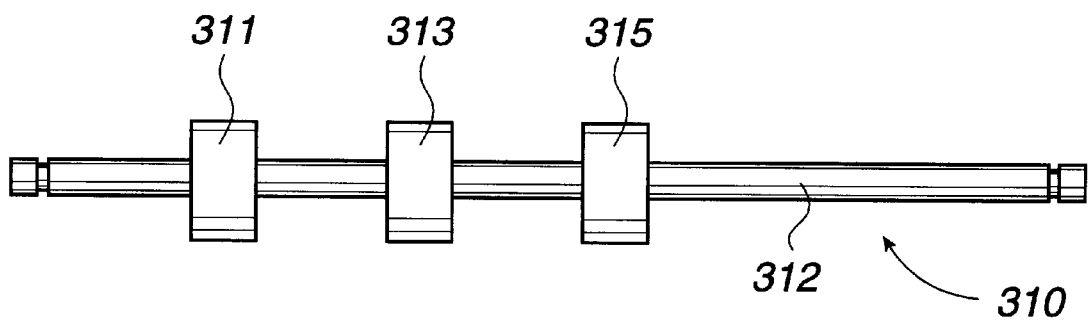
FIG. 14 is an illustration showing a roller setting member used for a passbook printer which is a preferred embodiment of the present invention.
Figure 15:
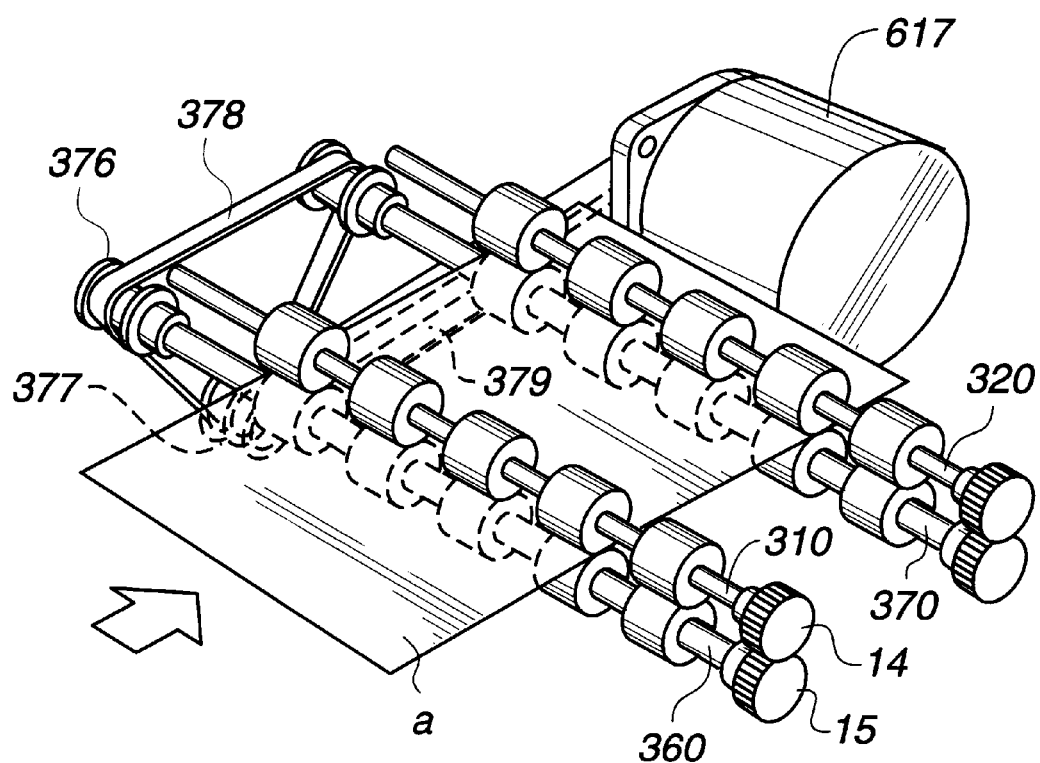
FIG. 15 is an illustration showing a part of a passbook printer which is a preferred embodiment of the present invention.

Then, in block 505, the user inserts the cardholder 200 by turning the magnetic stripe side of the card downward (hereafter, see FIGS. 12 and 13 according to necessity). In the case of the passbook printer 300 which is a preferred embodiment of the present invention, the magnetic head 305 is set under the feed path 309. Moreover, the passbook printer 300 which is a preferred embodiment of the present invention is able to print various types of documents in addition to the passbook 400. Because a magnetic stripe is not read for a document, it is preferable to distinguish the document from a passbook or magnetic card whose magnetic stripe is read through previous keyboard entries. This is because a document may be damaged by a magnetic head when magnetic stripe reading is applied to the document. However, as described above, it is also possible to detect a medium in accordance with the size of the medium.

When the cardholder 200 is inserted into an insertion slot 307, an insertion slot sensor 341 detects the cardholder 200 in block 507. That is, the insertion slot sensor 341 is turned on. Because the cardholder 200 has a large enough width compared to the magnetic card 100 it is securely detected by the sensor 341. Moreover, because the cardholder 200 has a color (white) with a high reflectance, it is rarely overlooked by the insertion slot sensor 314. A signal detected by the insertion slot sensor 341 is transferred to a control means. The control means rotates feed rollers 311, 321, and 331 in the forward direction in block 509. The feed rollers are rotated by a motor. The rotation of the feed rollers feeds the cardholder 200 in the forward direction in block 511. In this case, the roller setting member 310 and a roller setting member 320 are set at an interval larger than the length of the magnetic card 100. However, because the interval is smaller than the length of the cardholder 200, the cardholder 200 can be fed though the magnetic card 100 cannot be fed. Moreover, because the cardholder 200 can be fed by using the feed rollers 311, 313, 315, 317, 319, 321, 323, 325, 327, and 328 which are more than the number of feed rollers for feeding the magnetic card 100 and moreover, the embossed area 101 is covered with the opening 235 of the cardholder 200, the probability of medium's skewing is decreased.

Thereafter, when the cardholder 200 is fed and the bottom end of the cardholder 200 passes through the position of the insertion slot sensor 341, the insertion slot sensor 341 is turned off. Thus, the insertion slot sensor 341 detects the bottom end of the cardholder 200 in block 512. It is possible to detect the length of the medium according to a feeding distance until the insertion slot sensor 341 is turned off after the sensor 341 is turned on. As described above, because the cardholder 200 is made of a material with a high reflectance (white material) and the opening 235 where the magnetic card 100 is exposed does not pass under the insertion slot sensor 341, it is very rare that the length of a medium is erroneously detected.

Thereafter, the cardholder 200 reaches the top sensor 343 or the alignment sensor 345 (because the cardholder 200 has a sufficient width, it is securely detected by the top sensor 343 and the alignment sensor 345). The control means detects a skew of the top edge of the cardholder 200 by detecting a difference for the cardholder 200 to reach the top sensor 343 and the alignment sensor 345 (block 513). The control means decides whether the skew is a preset standard value or more (block 515). When the skew is the standard value or more, the control means inversely rotates feed rollers to eject the cardholder 200 (block 521). When the skew is less than the standard value, the control means feeds the cardholder 200 up to a predetermined position for reading the magnetic stripe 105 on the basis of the length of the cardholder 200 detected in block 512 (block 517). When the magnetic stripe 105 already precedes the magnetic head 305 while the bottom end of the cardholder 200 is detected, the control means inversely rotates the feed rollers to adjust the position of the magnetic stripe 105 to the position of the magnetic head 305 (a side optical sensor is turned on and control is performed according to the subsequent feeding distance).

Then, the magnetic head 305 is driven and the magnetic stripe is read (block 519). To realize the method of directly inserting the magnetic card 100 to read the magnetic stripe with a left alignment-type passbook printer, the magnetic head 305 shown in FIG. 12 must exceed a left guide of a feed path and move to the right side (in FIG. 13, a left guide is shown at right and a right guide is shown at left). However, because a preferred embodiment of the present invention uses the cardholder 200, there is no above restriction on design. In the case of a preferred embodiment of the present invention, the magnetic head 305 is driven by a magnetic head moving motor (not illustrated) in a direction (shown by an arrow) vertical to the feeding direction and the magnetic stripe is read. As shown in FIG. 12, when reading by the magnetic head 305, because the cardholder 200 holds five feed rollers of 321, 323, 325, 327, and 328, it will easily be understood that the stress and moment applied to each feed roller is smaller than the stress and moment for feeding the magnetic card 100 for reading. Therefore, it is not necessary to densely set the feed roller 311 and the like on the roller setting members 310, 320, and 330 or set the pressure to be applied to the feed roller to a large value.

When the magnetic stripe is present in a direction parallel with the feeding direction, it is also possible to drive the magnetic head to the position of the magnetic stripe (or move the magnetic head only upward or downward without vertically moving it) and move the cardholder 200 by feed rollers to read the magnetic stripe. After the magnetic stripe is read, the control means inversely rotates the feed rollers and ejects the cardholder (block 521) to complete the processing (block 523).

Figure 17:
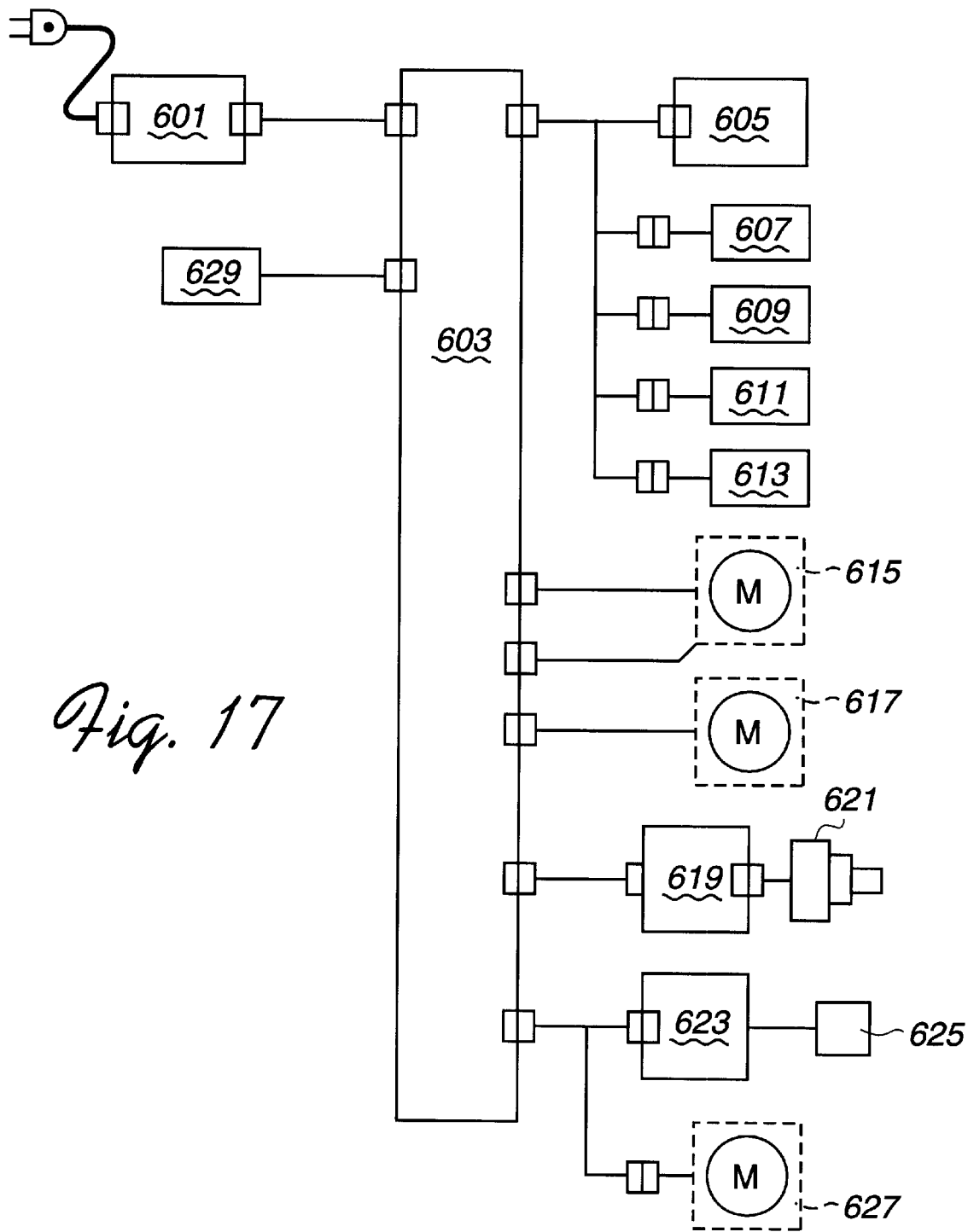
FIG. 17 is a block diagram showing an embodiment of a passbook printer of the present invention.

FIG. 17 shows a block diagram of the passbook printer 300 which is a preferred embodiment of the present invention. In FIG. 17, symbol 601 represents a power supply for supplying electric power to the passbook printer 300. Symbol 603 represents a main card for electrically connecting various sensors, motors, and control means 629. In the case of this embodiment, the control means 629 is a microprocessor unit on the main card 603, comprising an MPU, ROM, and RAM. The control means 629 can also be a computer connected to a passbook printer. The control means 629 receives signals from various sensors 607, 609, 611, and 613 to control various motors 615, 617, and 627 and various cards 605, 619, and 623 in accordance with a control program stored in the unit. The control means 629 can decide whether the data read by the same magnetic head 625 is the data in a magnetic card or the data in a passbook in accordance with the format of the data read by the magnetic head 625.

Symbol 605 represents an operator panel card for a user to input data or for displaying data on a display panel. Symbols 607 to 613 represent various sensors, 607 represents an insertion slot sensor, 609 represents a top sensor, 611 represents an alignment sensor, and 613 represents a jam detection sensor. Symbols 615, 617, and 627 represent motors, 615 represents a carrier motor for moving a print head, 617 represents a feed motor for rotating feed rollers (feeding motor), and 627 represents a magnetic head motor for driving a magnetic head. The print head 621 connects with the main card 603 through a connector card 619. The magnetic head (REMS) 625 connects with the main card 603 through the REMS card 623.

As described above, in the case of the preferred embodiments of the present invention, a case is described in which a magnetic stripe on a magnetic card is read by a passbook printer for processing a transverse directional magnetic stripe of a passbook. However, when the present invention is applied to a passbook printer for processing a longitudinal directional magnetic stripe, the magnetic stripe can be read by changing the card setting direction on the cardholder by 90°. In the case of a longitudinal directional stripe of a passbook, the position of a magnetic recording track is set on the basis of the left end of a medium (also on the basis of the right end for some stripes) and the medium is fed along a left guide of an apparatus feeding system. Therefore, it is possible to read a stripe by equalizing the dimension from the left end of the cardholder to a magnetic recording track on a card with the dimension from the left end of a passbook to a magnetic recording track on the passbook. When the distance from the left end of a passbook to the center of a magnetic recording track is 10.4 mm (that is, track-2), a card must be stored so as to fit the left end surface of the cardholder with the magnetic stripe side of the card because the distance coincides with track-2 of the card. In this case, the card has a degree of freedom for dropping out from the holder leftward. However, there is no problem because the two points of (1) the feeding direction is vertical and (2) the left end of the card is held by the left guide of the apparatus feeding system while the card is fed.

As described above, the present invention makes it possible to design a compact lightweight magnetic card-compatible passbook printer by using an exclusive magnetic cardholder because there is no restriction on design. Moreover, the present invention moderates the influence of the shape of a storage medium to be read. Furthermore, a magnetic card-compatible passbook printer of the present invention does not deteriorate the printing capacity or the feeding capacity of its own or does not increase the probability of malfunction or erroneous operations of its own. Furthermore, the passbook printer is not influenced by the type of a magnetic card and it has an advantage that there are only a few restrictions on the design of the movable range of a magnetic head. To decrease the number of restrictions on the design of a magnetic-card compatible passbook printer and decrease the magnetic-card compatible passbook printer in size and weight by using an exclusive magnetic cardholder.

What is claimed is:

1. A substantially rectangular flat cardholder insertable into a feed path of a magnetic recording medium reading unit having a magnetic head for reading a magnetic recording medium and a feed roller for feeding the magnetic recording medium, said cardholder comprising:

a first opening for holding a magnetic card having a magnetic stripe and embossment;

a second opening, provided at the bottom of said first opening, for housing said embossment; and a dropping-out preventive sheet for preventing said magnetic card from dropping out from said first opening; wherein said substantially rectangular flat cardholder has a leading edge wider than the width of said magnetic card, and smaller than the feed path of said magnetic recording medium reading unit, a side edge perpendicular to said leading edge being longer than the length of said magnetic card, and a thickness adopted to be inserted into said feed path.

2. The cardholder according to claim 1, wherein said cardholder is rectangular, the length of the diagonal line of said cardholder is longer than the width of said feed path, and the width of the leading edge of said cardholder is narrower than the width of said feed path.

3. The cardholder according to claim 1, wherein said dropping-out preventive sheet is provided so that the top of said magnetic card is exposed with a width of 11.0 mm–20.0 mm when said magnetic card is set.

4. The cardholder according to claim 1, further comprising an optical notch whose light reflectance for adjusting a length to be recognized by an optical sensor for detecting the length of a fed medium is 15% or less.

5. A flat cardholder insertable into a feed path of a recording medium processing apparatus to be fed by a feed roller to a recording medium reader of said recording medium processing apparatus, the cardholder having an opening for holding a card having a recording medium, a leading edge wider than the width of said card, and narrower than the width of the feed path of said recording medium processing apparatus, a side edge perpendicular to said leading edge and longer than the length of said card, and a thickness adapted to be inserted into said feed path; wherein said cardholder opening is positioned within said cardholder so that said card recording medium is positioned to be read by said apparatus reader.

6. A flat cardholder insertable into a feed path of a recording medium processing apparatus to be fed by a feed roller to a recording medium reader of said recording medium processing apparatus, the cardholder having an opening for holding a card having a recording medium, a leading edge wider than the length of said card recording medium and narrower than the width of the feed path of said recording medium processing apparatus, a side edge perpendicular to said leading edge being longer than the width of said card, and a thickness smaller than said feed path; wherein said cardholder opening is positioned within said cardholder so that said card recording medium is positioned to be read by said apparatus reader.

7. A method for reading data from a magnetic stripe of a magnetic card having embossment by using a magnetic head in a passbook printer provided with a magnetic head and a plurality of roller setting members each of which has a plurality of feed rollers on their roller shafts by using a dropping-out preventive sheet for holding said magnetic card in a first opening of a cardholder, housing the embossment of said magnetic card with a second opening provided at the bottom of said first opening, and preventing said magnetic card from dropping out from said first opening, the method comprising the steps of:

detecting that a flat cardholder having a leading edge wider than the length of said magnetic card and narrower than the width of the feed path of said passbook printer, a side edge perpendicular to said leading edge being longer than the width of said magnetic card, and a thickness smaller than said feed path is inserted into the feed path of said passbook printer;

starting the rotation of the feed rollers of said passbook printer when it is detected that said cardholder has been inserted into said feed path;

feeding said cardholder by using the feed rollers of said reading unit;

adjusting a track in which the data in the magnetic stripe of said magnetic card held by said cardholder is recorded to the position of said magnetic head; and moving said magnetic head and reading data from said magnetic stripe.

8. The method according to claim 7, further comprising the step of deciding whether said read data is the data in a magnetic stripe of a magnetic card or the data in a magnetic stripe of a passbook.

9. A method for reading a card having a recording medium in a recording medium processing apparatus provided with a plurality of roller setting members each of which has a plurality of feed rollers on their roller shafts, the method comprising the steps of:

feeding a flat cardholder for holding said card in a first opening of said cardholder and having a leading edge substantially wider than the length of said card and narrower than that of the feed path of said recording medium processing apparatus, a side edge perpendicular to said leading edge being longer than the width of said card and a thickness smaller than said feed path by using the feed rollers of said recording medium processing apparatus when it is detected that said flat cardholder is inserted into said feed path; and stopping said card recording medium of said card held by said cardholder at a recording medium processing position.

10. A method for reading or writing data from or in a card having a recording medium in a recording medium processing apparatus provided with a head for performing a read or write operation and a plurality of roller setting members each of which has a plurality of feed rollers on their roller shafts, the method comprising the steps of:

feeding a flat cardholder for holding said card medium in a first opening of said cardholder and having a leading edge substantially longer than the length of said card and narrower than that of the feed path of said recording medium processing apparatus, a side edge perpendicular to said leading edge being longer than the width of said card, and a thickness smaller than said feed path by using the feed rollers of said recording medium processing apparatus when it is detected that said flat cardholder is present in said feed path;

adjusting the data storage position of said recording medium of said card held by said cardholder to the position of said head; and reading data from said card recording medium or writing data in said card recording medium by using said head.

11. A method for reading data from a magnetic stripe of a magnetic card by using a magnetic head in a passbook printer provided with a magnetic head and a plurality of roller setting members each of which has a plurality of feed rollers on their roller shafts, the method comprising the steps of:

detecting that a flat cardholder holding said magnetic card in a first opening of said cardholder and having a leading edge substantially wider than the length of said magnetic card and narrower than that of the feed path of said passbook printer, a side edge perpendicular to said leading edge being longer than the width of said magnetic card, and a thickness smaller than said feed path is inserted into the feed path of said passbook printer starting the rotation of the feed rollers of said passbook printer when it is detected that said holder is inserted into said path;

feeding said cardholder by using the feed rollers of said reading unit;

adjusting a track saving the data in the magnetic stripe of said magnetic card held by said cardholder to the position of said magnetic head; and moving said magnetic head and reading data from said magnetic card.

12. A passbook printer capable of reading data from a magnetic stripe of a passbook by a magnetic head, comprising:

a flat cardholder holding a magnetic card with a magnetic stripe located on a surface of said magnetic card in a first opening of said cardholder and having a leading edge substantially wider than the length of said magnetic card and narrower than that of the feed path of said passbook printer, a side edge perpendicular to said leading edge being longer than the width of said magnetic card, and a thickness smaller than said feed path; and an optical sensor capable of detecting that a passbook with a magnetic stripe located on the surface of said magnetic card is inserted into the feed path of said passbook printer;

feed roller control means for controlling a plurality of feed rollers capable of feeding said passbook and said cardholder jointly with a plurality of roller setting members each of which has a plurality of feed rollers on their roller shafts and which are arranged at an interval longer than the width of said magnetic card and adjusting a track saving the data stored in the magnetic stripe of said magnetic card held by said cardholder to the position of said magnetic head;

a magnetic head for reading data from said magnetic card;

a magnetic head moving motor for moving said magnetic head; and means for deciding whether the data read by said magnetic head is the data of said magnetic card or the data of said passbook.

13. The passbook printer according to claim 12, wherein said deciding means produces a decision on the basis of the format of read data.

14. A passbook printer capable of printing characters on a passbook by a print head and reading a magnetic stripe located on the cover of the passbook by a magnetic head, comprising:

a flat cardholder holding a magnetic card with a magnetic stripe located on a surface of said magnetic card in a first opening of said cardholder and having a leading edge substantially wider than the length of said magnetic card and narrower than that of the feed path of said passbook printer, a side edge perpendicular to said leading edge being longer than the width of said magnetic card, and a thickness smaller than said feed path; a passbook with a magnetic stripe located on the surface of said magnetic card; and an optical sensor positioned to sense optical signals reflected from a surface of either a passbook or a cardholder capable of detecting that three types of media of a document are respectively inserted into the feed path of said passbook printer;

means for detecting a user input for deciding whether a medium inserted into said feed path is any one of (1) a cardholder and (2) a passbook or (3) a passbook;

feed roller control means for controlling said feed rollers capable of feeding said passbook and said cardholder jointly with a plurality of roller setting members each of which has a plurality of feed rollers on their roller shafts and which are arranged at an interval longer than the width of said magnetic card and adjusting a track saving the data of the magnetic stripe stored in said magnetic card held by said cardholder to the position of said magnetic head when said user input is a signal showing any one of (1) the cardholder and (2) the passbook;

a magnetic head moving motor for moving said magnetic head and reading data from said magnetic card; and means for deciding whether the data read by said magnetic head is the data stored in the magnetic stripe of said magnetic card or the data stored in the magnetic stripe of said passbook.

* * * * *